United States Patent
Kitazume (10) Patent No.: US 9,919,734 B2
(45) Date of Patent: Mar. 20, 2018

(54) ELECTRIC POWER STEERING APPARATUS

(71) Applicant: NSK Ltd., Shinagawa-ku, Tokyo (JP)

(72) Inventor: Tetsuya Kitazume, Maebashi (JP)

(73) Assignee: NSK Ltd., Tokyo (JP)

( * ) Notice: Subject to any disclaimer, the term of this patent is extended or adjusted under 35 U.S.C. 154(b) by 452 days.

(21) Appl. No.: 14/408,822

(22) PCT Filed: Jan. 31, 2014

(86) PCT No.: PCT/JP2014/000520
§ 371 (c)(1),
(2) Date: Dec. 17, 2014

(87) PCT Pub. No.: WO2014/122907
PCT Pub. Date: Aug. 14, 2014

(65) Prior Publication Data
US 2015/0151783 A1    Jun. 4, 2015

(30) Foreign Application Priority Data

Feb. 8, 2013   (JP) .................................. 2013-023368

(51) Int. Cl.
*B62D 5/04* (2006.01)
(52) U.S. Cl.
CPC ......... *B62D 5/0472* (2013.01); *B62D 5/0463* (2013.01); *B62D 5/0481* (2013.01)
(58) Field of Classification Search
CPC ... B62D 5/0463; B62D 5/0472; B62D 5/0481
See application file for complete search history.

(56) References Cited

U.S. PATENT DOCUMENTS

| 6,148,948 | A | 11/2000 | Shimzu et al. |
| 6,272,410 | B2 * | 8/2001 | Okanoue ............. B62D 5/0463 180/400 |
| 6,360,151 | B1 | 3/2002 | Suzuki et al. |
| 7,711,463 | B2 * | 5/2010 | Oya ..................... B62D 5/0463 475/19 |

(Continued)

FOREIGN PATENT DOCUMENTS

| EP | 1 093 992 A2 | 4/2001 |
| EP | 1 852 330 A1 | 11/2007 |

(Continued)

OTHER PUBLICATIONS

Supplementary European Search Report issued in counterpart European Application No. 14749431.4 dated Jun. 3, 2016 (5 pages).

(Continued)

*Primary Examiner* — Jerrah Edwards
(74) *Attorney, Agent, or Firm* — Crowell & Moring LLP (57) ABSTRACT

To provide an electric power steering apparatus capable of suppressing a vibration of an assist torque while keeping a steering feeling. A current command value is calculated by adding a torque differential compensation value depending on a differential value of a steering torque to a basic assist current command value calculated based on the steering torque and vehicle speed. In this situation, the torque differential compensation value is calculated to be smaller when the steering speed of a steering wheel falls within a specific steering speed region in which a resonance phenomenon easily occurs due to a disturbance vibration of a steering assist torque, in comparison with when the steering speed falls outside the specific steering speed region.

10 Claims, 7 Drawing Sheets

(56) References Cited

U.S. PATENT DOCUMENTS

| | | | |
|---|---|---|---|
| 7,778,753 B2* | 8/2010 | Fujiwara | B60T 8/17558 340/435 |
| 7,831,355 B2* | 11/2010 | Nishiyama | B62D 5/0472 180/410 |
| 2001/0002631 A1* | 6/2001 | Okanoue | B62D 5/0463 180/446 |
| 2005/0267660 A1* | 12/2005 | Fujiwara | B60T 8/17558 701/41 |
| 2007/0168094 A1* | 7/2007 | Nishiyama | B62D 5/0472 701/41 |
| 2007/0198153 A1* | 8/2007 | Oya | B62D 5/0463 701/41 |
| 2011/0010050 A1 | 1/2011 | Suzuki et al. | |
| 2012/0185132 A1 | 7/2012 | Kezobo et al. | |
| 2013/0261894 A1 | 10/2013 | Kojima | |

FOREIGN PATENT DOCUMENTS

| | | |
|---|---|---|
| JP | 2001-114121 A | 4/2001 |
| JP | 2002-326577 A | 11/2002 |
| JP | 2011-16435 A | 1/2011 |
| JP | 2011-88491 A | 5/2011 |
| JP | 2012-106678 A | 6/2012 |
| WO | WO 2011/052470 A1 | 5/2011 |

OTHER PUBLICATIONS

Japanese Office Action issued in counterpart Japanese Application No. 2014-560674 dated Aug. 25, 2015, with partial English translation (Three (3) pages).

International Preliminary Report on Patentability (PCT/IB/338 & PCT/IB/373) issued in PCT Application No. PCT/JP2014/000520 dated Aug. 20, 2015, including English translation of document C2 (Japanese language Written Opinion (PCT/ISA/237)) previously filed on Dec. 17, 2014 (eight (8) pages).

International Search Report (PCT/ISA/210) dated Mar. 25, 2014, with English translation (Five (5) pages).

Japanese language Written Opinion (PCT/ISA/237) dated Mar. 25, 2014 (Four (4) pages).

* cited by examiner

ELECTRIC POWER STEERING APPARATUS

TECHNICAL FIELD

The present invention relates to an electric power steering apparatus to apply a steering assist force reducing a steering burden of a driver to a steering system.

BACKGROUND ART

Conventionally, an electric power steering apparatus is in widespread use as a steering apparatus. The electric power steering apparatus applies a steering assist force to a steering mechanism by driving an electric motor depending on a steering torque when a driver steers a steering wheel.

As such an electric power steering apparatus, for example, a technique described in PTL 1 is known. This technique compensates a basic assist control amount depending on the steering torque with a torque differential compensation value depending on a differential value of the steering torque. In this case, the torque differential compensation value is corrected to be smaller as a steering speed becomes higher. This suppresses the excessive increase of the torque differential compensation value when the steering speed is high, and keeps a good steering feeling regardless of the steering speed.

As an electric power steering apparatus for obtaining a good steering feeling similarly, for example, a technique described in PTL 2 is known. This technique calculates a product of a gain and a value obtained by dividing a steering torque differential value by a steering angle differential value, as the torque differential compensation value. This suppresses the decrease of the torque differential compensation value when starting to turn the steering wheel slowly, and obtains a good steering feeling.

CITATION LIST

Patent Literature

PTL 1: JP 2001-114121 A
PTL 2: JP 2002-326577 A

SUMMARY OF INVENTION

Technical Problem

In the electric power steering apparatus, a resonance phenomenon in which a relatively large vibration is continuously occurs at a specific steering speed in which a vibration frequency of an assist torque overlaps a resonance frequency of a mechanical system. This makes an occupant of a vehicle feel an uncomfortable sound and vibration.

However, the techniques described in PTL 1 and PTL 2 intend to keep the steering feeling and decrease the torque differential compensation value as the torque speed becomes higher. Thus these techniques cannot reduce the torque differential compensation value in only a specific steering speed region in which the resonance phenomenon occurs. Therefore, the above mentioned resonance phenomenon cannot be suppressed sufficiently. Additionally, when the torque differential compensation value was totally set to a relatively small value for the purpose of suppressing the resonance phenomenon, the steering feeling outside the steering speed region in which the resonance phenomenon occurs would not can be kept in good condition.

Accordingly, the object of the present invention is to provide an electric power steering apparatus capable of suppressing the vibration of the assist torque while keeping the steering feeling.

Solution to Problem

In order to achieve the above-mentioned object, according to the first aspect of the present invention, there is provided an electric power steering apparatus including a steering torque detection unit configured to detect a steering torque applied to a steering mechanism, a current command value calculation unit configured to calculate a current command value based on at least the steering torque detected by the steering torque detection unit, an electric motor configured to generate a steering assist torque to be applied to a steering shaft of the steering mechanism, a motor control unit configured to control driving of the electric motor based on the current command value, and a steering speed detection unit configured to detect a steering speed of a steering wheel. The current command value calculation unit includes a basic assist current calculation unit configured to calculate a basic assist current command value based on at least the steering torque detected by the steering torque detection unit, a torque differential compensation value calculation unit configured to calculate a torque differential compensation value based on a differential value of the steering torque, and a correction unit configured to correct the torque differential compensation value calculated by the torque differential compensation value calculation unit when the steering speed detected by the steering speed detection unit falls within a specific steering speed region in which a resonance phenomenon occurs at a vehicle body due to a disturbance vibration of the steering assist torque to be smaller than the torque differential compensation value when the steering speed falls outside the specific steering speed region. The current command value calculation unit is configured to calculate the current command value by adding the torque differential compensation value corrected by the correction unit to the basic assist current command value calculated by the basic assist current calculation unit.

In this way, the torque differential compensation value in the specific steering speed region in which the resonance phenomenon easily occurs is set to be a smaller in comparison with the torque differential compensation value in another steering speed region. It is possible to suppress a fluctuation in an assist torque due to a resonance and to prevent an occupant of a vehicle from feeling an uncomfortable sound and vibration. Furthermore, since the torque differential compensation value is not reduced outside the specific steering torque speed, it is possible to keep a good steering feeling.

DESCRIPTION OF EMBODIMENTS

Hereinafter, embodiments of the present invention will be described with reference to the drawings.

(First Embodiment)

Figure 1:
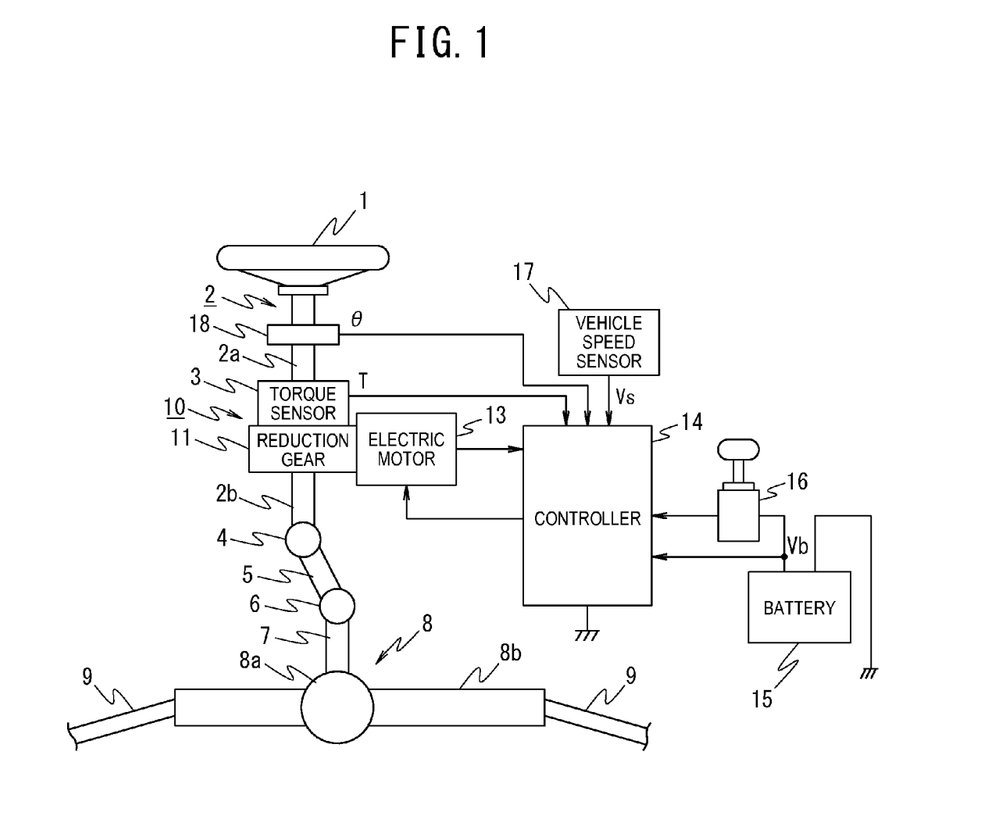
FIG. 1 is a schematic configuration diagram of an electric power steering apparatus according to the present embodiment.

FIG. 1 is a schematic of an entire of configuration of an electric power steering apparatus according to the present embodiment.

In the drawings, a reference numeral 1 denotes a steering wheel. A steering force applied by the driver to the steering wheel 1 is transmitted to a steering shaft 2 having an input shaft 2a and an output shaft 2b. One end of the input shaft 2a of the steering shaft 2 is coupled to the steering wheel 1, the other end is coupled to one end of the output shaft 2b via a steering torque sensor 3 as a steering torque detection unit.

Then, the steering force transmitted to the output shaft 2b is transmitted to an intermediate shaft 5 via a universal joint 4. Then, the steering force is transmitted to a pinion shaft 7 via a universal joint 6. The steering force transmitted to the pinion shaft 7 is transmitted to a tie rod 9 via a steering gear 8 to turn turning wheels, not illustrated.

In this situation, the steering gear 8 employs a rack-and-pinion type including a pinion 8a coupled to the pinion shaft 7 and a rack 8b engaging with the pinion 8a, and converts a rotational motion transmitted to the pinion 8a into a linear motion of the rack 8b.

A steering assist mechanism 10, which transmits a steering assist force to the output shaft 2b, is linked to the output shaft 2b of the steering shaft 2. The steering assist mechanism 10 includes a reduction gear 11 coupled to the output shaft 2b, and an electric motor 13 which is coupled to the reduction gear 11 for generating a steering assist force for a steering system.

The steering torque sensor 3 detects the steering torque applied to the steering wheel 1 and transmitted to the input shaft 2a. For example, the steering torque sensor 3 is configured to convert the steering torque into a torsional angle displacement of a torsion bar, not illustrated, inserted between the input shaft 2a and the output shaft 2b, to detect this torsional angle displacement as a magnetic signal, and convert the magnetic signal into an electrical signal. A torque detection value T, outputted from the steering torque sensor 3 is received by a controller 14.

Power is supplied to the controller 14 from a battery 15 (for example, 13 V) as a DC power supply, so that the controller 14 is operated. A negative electrode of the battery 15 is grounded. A positive electrode of the battery 15 is connected to the controller 14 via an ignition switch 16 used for starting an engine, and is directly connected to the controller 14 without interposing the ignition switch 16 therebetween.

A vehicle speed Vs detected by a vehicle speed sensor 17 and a steering angle θ detected by a steering angle sensor 18 are received by the controller 14 in addition to the steering torque T. The controller 14 performs a steering assist control for applying the steering assist force (steering assist torque) to the steering system based on the steering torque T, the vehicle speed Vs, and the steering angle θ. Specifically, the controller 14 calculates a current command value, which is used to generate the steering assist force by the electric motor 13, and performs the feedback control of a drive current supplied to the electric motor 13, based on the calculated current command value and a motor current detection value.

Figure 2:
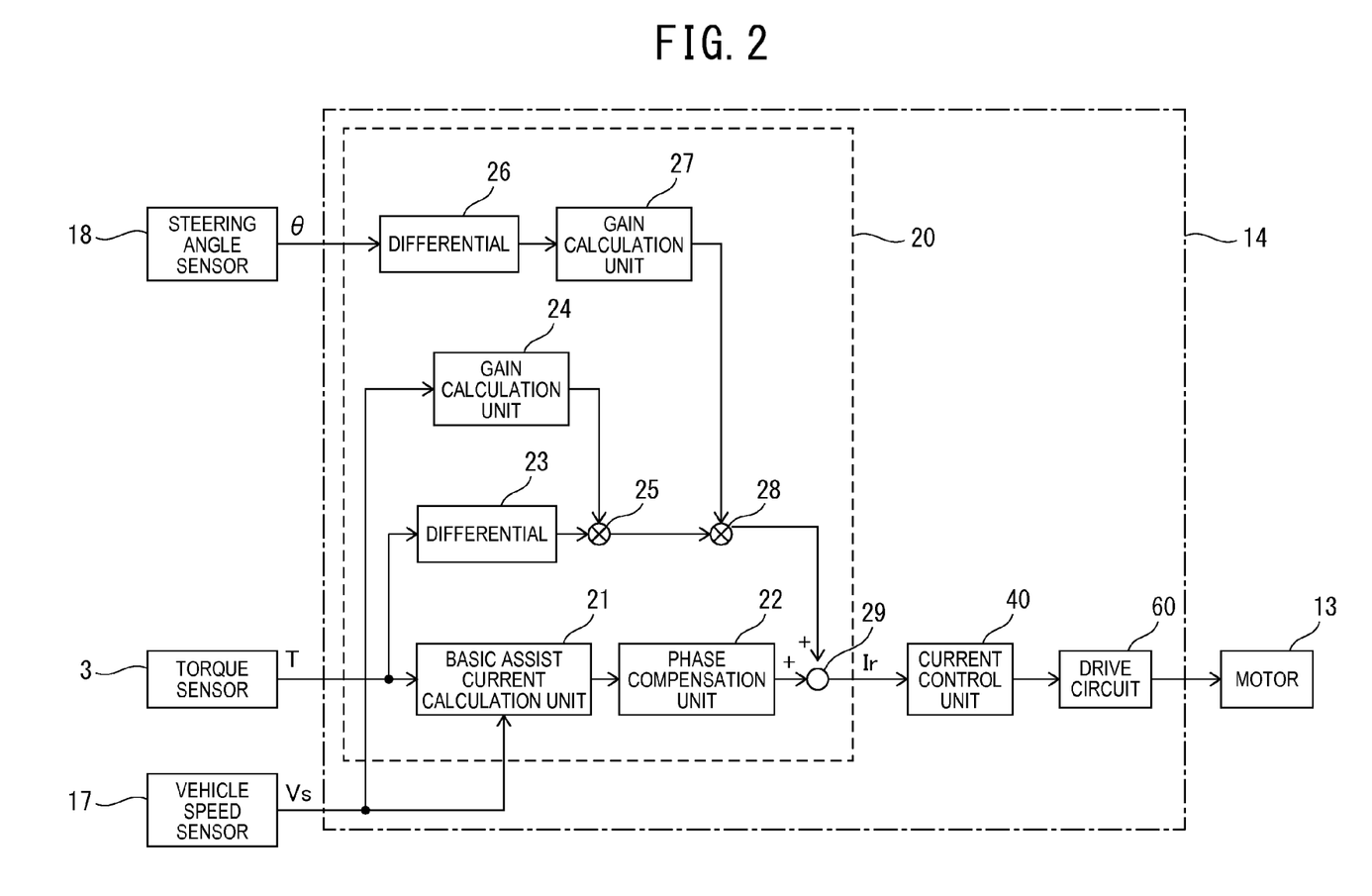
FIG. 2 is a block diagram illustrating a configuration of a controller in the first embodiment.

FIG. 2 is a block diagram illustrating a configuration of the controller 14. As illustrated in FIG. 2, the controller 14 includes an assist current command value calculation unit 20 configured to calculate the above mentioned current command value, a current control unit 40, and a drive circuit 60.

The assist current command value calculation unit 20 includes a basic assist current calculation unit 21, a phase compensation unit 22, a differential circuit 23, a gain calculation unit 24, a gain multiplier unit 25, a deferential circuit 26, a gain calculation unit 27, a gain multiplier unit 28, and an adder unit 29.

The basic assist current calculation unit 21 is configured to receive the steering torque T and the vehicle speed Vs and calculate a basic assist current command value for generating the steering assist force depending on the steering torque T and the vehicle speed Vs by the electric motor 13.

The phase compensation unit 22 is configured to compensate of the phase of the basic assist current command value calculated by the basic assist current calculation unit 21 to output the basic assist current command value after the phase compensation to the adder unit 29 described below. In this situation, the phase compensation unit 22 is configured as a phase-lead compensator or a phase-delay compensator having a characteristic expression $G(s)=(T1 \cdot s+1)/(T2 \cdot s+1)$, where s is Laplace operator.

The differential circuit 23 is configured to calculate a steering torque differential value by differentiating the steering torque T.

The gain calculation unit 24 is configured to receives the vehicle speed Vs and calculate a gain Gv varying depending on the vehicle speed Vs by means of a conversion table or arithmetic processing. The gain Gv, for example, is characteristic in that the gain Gv increases as the vehicle speed Vs increases in a low vehicle speed region and decreases as the vehicle speed increases Vs in a medium or a high vehicle speed region.

The gain multiplier unit 25 is configured to calculate a torque differential compensation value by multiplying the steering torque differential value output by the differential circuit 23 by the gain Gv calculated by the gain calculation unit 24.

In this situation, a torque differential compensator is comprised of the differential circuit 23, the gain calculation unit 24 and the gain multiplier unit 25. This torque differential compensator is provided for the purpose of compensation for static friction, improvement in a steering feeling, and improvement in stability.

Furthermore, the deferential circuit 26 is configured to calculate a steering speed by differentiating the steering angle θ.

Figure 3:
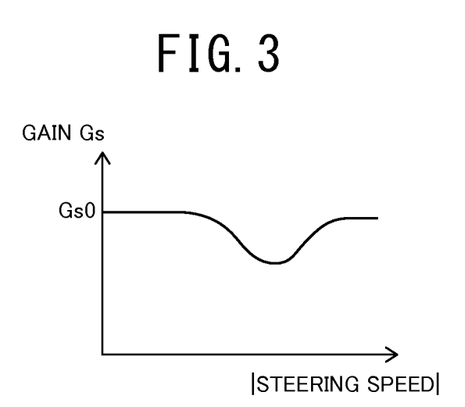
FIG. 3 is a view illustrating a gain calculation map.

The gain calculation unit 27 is configured to receive the steering speed output from the deferential circuit 26, and calculate a gain Gs varying depending on the steering speed by reference to a gain calculation map illustrated in FIG. 3. As illustrated in FIG. 3, the gain calculation map represents an absolute value of the steering speed in abscissa and the gain Gs in ordinate, and is set so as to calculate the gain Gs in a predetermined steering speed range to be smaller in comparison with a gain reference value Gs0 (Gs0=1, for example) in another steering speed range.

In this situation, the steering speed range in which the gain Gs is small is set to a steering speed range in which a so-called resonance phenomenon easily occurs. In the resonance phenomenon, a relatively large vibration occurs due to an overlap of a vibration frequency of the assist torque and a resonance frequency of a mechanical system (a natural frequency of a vehicle body). This will be described below in detail.

The gain multiplier unit 28 is configured to calculate a corrected torque differential compensation value by multiplying the torque differential compensation value output by the gain multiplier unit 25 by the gain Gs calculated by the gain calculation unit 27. That is, the torque differential compensation value in a specific steering speed region is corrected to be smaller in comparison with the torque differential compensation value in another torque differential compensation value.

Then, the adder unit 29 is configured to add the corrected torque differential compensation value output by the gain multiplier unit 28 to the basic assist current command value after the phase compensation output by the phase compensation unit 22, and output the result to the current control unit 40 as a current command value Ir which is an output of the assist current command value calculation unit 20.

The current control unit 40 is configured to receive the current command value Is calculated by the assist current command value calculation unit 20, and calculate a current deviation between the current command value Ir and a actual motor current of the electric motor 13. Then, the current control unit 40 is configured to calculate a voltage command value by performing a PI control on the current deviation and calculate a duty ratio of the PMW signal activating semiconductor switching elements of the drive circuit 60 to control driving of the electric motor 13, based on the voltage command value. The current control unit 40 is configured to output the duty ratio to the drive circuit 60.

The drive circuit 60 is configured to activate the semiconductor switching elements based on the duty ratio calculated by the current control unit 40 to drive the electric motor 13.

Next, the steering speed range in which the resonance phenomenon easily occurs will be described specifically.

Figure 4:
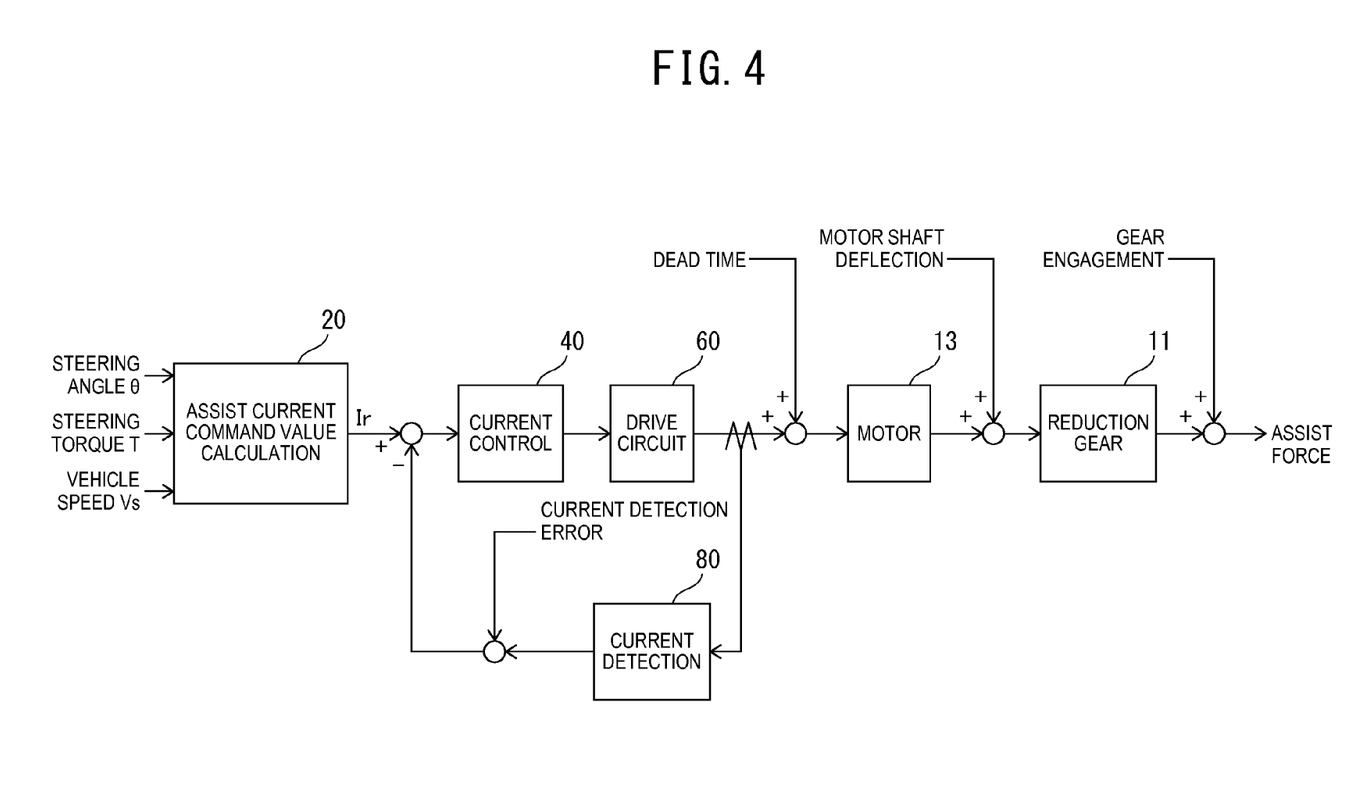
FIG. 4 is a block diagram illustrating a control system for a steering assist control.

As illustrated in FIG. 4, in the steering assist control, firstly the current command value Ir is calculated based on the steering torque T, the vehicle speed Vs, and steering angle θ, as described above (the assist current command value calculation unit 20). Next, the actual motor current of the electric motor 13 is detected (a current detection unit 80). The PI control is performed based on the deviation between the current command value Ir and a actual motor current of the electric motor 13 to calculate the duty ratio of the PMW signal activating the semiconductor switching elements of the drive circuit 60 of the electric motor 13 (the current control unit 40). Then, the semiconductor switching elements of the drive circuit 60 is activated based on the calculated duty ratio to control driving the electric motor 13. When the electric motor 13 is driven, the rotating force of the electric motor 13 is transmitted to the reduction gear 11 coupled to a motor shaft, and then transmitted to the output shaft 2b of the steering shaft 2 coupled to the reduction gear 11. Thus the assist force is applied.

The loop where the electric motor 13 is driven based on the current command value Ir, and the assist force is applied to the steering system includes an engagement error of the reduction gear 11, a current detection error in the current detection unit 80 (a motor current detection sensor), an error due to a dead time when activating the semiconductor switching elements of the drive circuit 60, an installation error of the electric motor 13 (a displacement of the center of the motor rotating shaft), and the like.

Then, these error may be factors of the occurrence of the vibration in the assist torque. That is, the factors of the occurrence of the vibration in the assist torque include an engagement vibration of the reduction gear 11 firstly. In this situation, the vibration frequency f (Hz) occurring in the steering shaft 2 can be represented by the following expression.

$$f = \omega/360 \cdot N \quad (1)$$

Here, ω represents the steering speed (deg/s), and N represents the number of teeth of a driven gear.

Furthermore, the second factor of the occurrence of the vibration in the assist torque is a motor torque fluctuation. Then, in this situation, the vibration frequency f (Hz) occurring in the steering shaft 2 varies depending on order components of the motor angle corresponding to fluctuation factors.

$$f = \omega/360 \cdot G \cdot M \cdot n \quad (2)$$

Here, G represents a reduction gear ratio, M represents the number of magnetic pole pairs of the motor, and n represents the order component of the motor electrical angle corresponding to a vibration factor. The relationship between the major vibration factors and the order components of the motor electrical angle are as follows.

The first order component of the motor electrical angle: a current detection value offset error The second order component of the motor electrical angle: a current detection value gain error The sixth order component of the motor electrical angle: a dead time error, a motor back electromotive voltage error, a motor angle sensor error Furthermore, the third factor of the occurrence of the vibration in the assist torque is the motor installation error. In this situation, the vibration frequency f (Hz) occurring in the steering shaft 2 varies depending on a motor mechanical angle.

$$f = \omega/360 \cdot G \cdot k \quad (3)$$

Here, k represents an order component of the motor mechanical angle corresponding to the vibration factor. The relationship between the major vibration factor and the order component of the motor mechanical angle are as follows.

The first order component of the motor mechanical angle: the displacement of the center of the motor rotation shaft.

In this way, relational expressions represented by the above mentioned expressions (1) to (3) are established between the vibration frequency f of the assist torque and the steering speed ω depending on the vibration factors. Then, the present embodiment uses the above expressions (1) to (3) to previously calculate the steering speed in which the resonance phenomenon easily occurs, that is, the steering speed in which the vibration frequency f equals to the natural frequency of the vehicle body, and sets the gain Gs such that the torque differential compensation value in the vicinity of the calculated steering speed becomes smaller in comparison with the torque differential compensation value in another steering speed. It is noted that plural of the steering speeds in which the gain Gs is reduced are set when the resonance phenomenon occurs at plural of steering speeds.

The natural frequency of the vehicle body is dependent on stiffnesses of respective parts of the vehicle, and may commonly fall within a range of 40 Hz to 60 Hz. Therefore, by focusing on an assist torque fluctuation caused due to the engagement vibration of the reduction gear 11 for example, in the calculation of the steering speed in which the resonance phenomenon easily occurs, the steering speed region in which the vibration frequency f is identical to the natural frequency range (40 Hz to 60 Hz) of the vehicle body is determined based on the above expression (1) (a specific steering speed setting unit), and the determined steering speed region is set as the steering speed region in which the resonance phenomenon easily occurs.

Next, the operation of the first embodiment is performed will be described.

When the driver performs a steering operation, the steering torque sensor 3 detects the steering torque T in response to the steering operation, the steering angle sensor 18 detects the steering angle θ. Furthermore, when the vehicle is travelling, the vehicle speed sensor 17 detects the vehicle speed Vs. Then, the controller 14 receives the steering torque T, the steering angle θ, and the vehicle speed Vs. In this situation, the controller 14 calculates the basic assist current command value depending on the steering torque T and the vehicle speed Vs, and performs the shift compensation on the calculated basic assist current command value. On the other hand, the controller 14 calculates the torque differential compensation value depending on the steering torque differential value in order to improve the steering feeling. Then, the controller 14 calculates the current command value Ir by adding the torque differential compensation value to the basic assist current command value, and controls of driving the electric motor 13 based on the current command value Ir. In this way, the assist torque depending on the steering operation by the driver is applied to the steering system, and the driver can perform the steering operation with a small force.

Incidentally, the frequency of the sound and the vibration occurring at the vehicle is the resonance frequency, which is dependent on the stiffnesses of the respective parts of the vehicle, and often falls within the range of 40 Hz to 60 Hz. Then, when the vibration frequency of the assist torque fluctuation transmitted to the vehicle body becomes the vicinity of the resonance frequency of the vehicle body, the sound and the vibration occur at the vehicle become large.

On the other hand, a disturbance vibration of the assist torque is also transmitted to the driver via the steering wheel. Then, the component of the disturbance vibration of the assist torque transmitted to the driver is detected by the steering torque sensor as a vibration of the steering torque signal, and is used in the controller 14 for the steering assist control. Especially, when the resonance phenomenon occurs due to the disturbance vibration of the assist torque, not only the vehicle body but also a steering system vibrates, and the vibration is easily detected as a fluctuation in the steering torque signal.

Figure 5A:
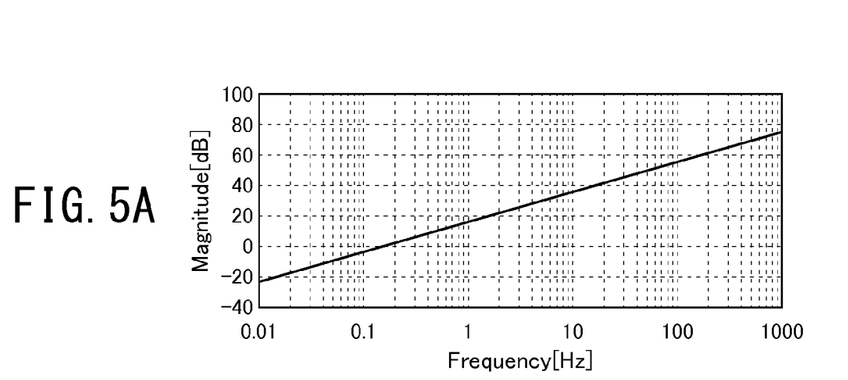
FIG. 5A and FIG. 5B are views illustrating frequency characteristics of an ideal differential compensator.
Figure 5B:
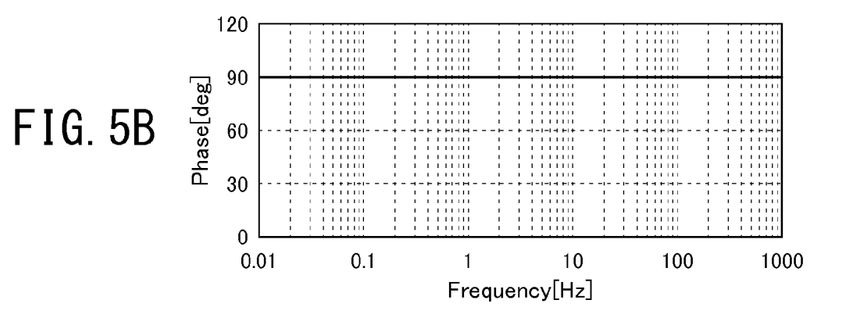

Since the torque differential compensator applied for the purpose of improving the steering feeling is a differential compensator, the torque differential compensator is characteristic in that an amplitude frequency characteristic increases at a high frequency, as illustrated in FIG. 5. The frequency region which is generally considered to be affecting the steering region is 20 Hz or less. When the steering torque signal included a vibration having the vibration frequency of 40 Hz to 60 Hz, the torque differential compensator would needlessly amplify the frequency component higher than the frequency affecting the steering region. In this situation, the torque differential compensation value appears as the fluctuation of the assist torque, and the driver feels the fluctuation of the assist torque as an uncomfortable vibration.

Therefore, the present embodiment calculates the torque differential compensation value to be smaller at the steering speed in which the resonance phenomenon easily occurs in comparison with another steering speed. In this way, it is possible to suppress the vibration component of the assist current, and to prevent the driver from feeling the fluctuation in the assist torque eventually.

Furthermore, since the torque differential compensation value is reduced at only the vicinity of the steering speed region in which the resonance phenomenon occurs, it is possible to set assist characteristics with emphasis on the steering feeling, and to keep a good steering feeling outside the steering speed region in which the resonance phenomenon occurs. That is, it is possible to leave the frequency of the vibration necessary to the steering (the vibration due to the road surface reaction force while driving or the like), and to reduce the vibration component with which the driver feels uncomfortable.

Furthermore, the steering speed range in which the torque differential compensation value is reduced is set depending on the factor of the disturbance vibration of the assist torque. Therefore, it is possible to appropriately suppress the fluctuation appearing in the assist torque due to the resonance. Furthermore, considering that the relational expression indicating the relationship between the steering speed and the frequency of the assist torque disturbance vibration is different for each vibration factor of the assist torque, the relational expressions (the above expressions (1) to (3)) for the respective vibration factors are used to specify the steering speed in which the resonance phenomenon easily occurs. Therefore, it is possible to more appropriately suppress the fluctuation appearing in the assist torque due to the resonance.

As stated above, it is possible to perform a control capable of suppressing the fluctuation appearing in the assist torque due to the resonance in the steering speed region in which the resonance phenomenon easily occurs, and a control capable of switching the characteristic of the steering feeling so as to keep the good steering feeling in another steering speed region.

It is noted that, in FIG. 1, the steering torque sensor 3 corresponds to a steering torque detection unit, the vehicle speed sensor 17 corresponds to a vehicle speed detection unit, and the steering angle sensor 18 corresponds to a steering angle detection unit. Furthermore, in FIG. 2, the assist current command value calculation unit 20 corresponds to a current command value calculation unit, and the current control unit 40 and the drive circuit 60 correspond to a motor control unit.

Furthermore, the basic assist current calculation unit 21 corresponds to the basic assist current calculation unit, the differential circuit 23 corresponds to a steering torque differential value calculation unit, the differential circuit 26 corresponds to a steering speed detection unit, the gain calculation unit 24, the gain multiplier unit 25, the gain calculation unit 27 and the gain multiplier unit 28 correspond to calculate a torque differential compensation value calculation unit. Furthermore, the gain calculation unit 27 and the gain multiplier unit 28 correspond to a correction unit.

(Second Embodiment)

Next, the second embodiment of the present invention will be described.

The second embodiment detects a differential value of the motor rotation angle of the electric motor 13 as the steering speed, whereas the first embodiment described above detects the differential value of the steering angle as the steering speed.

Figure 6:
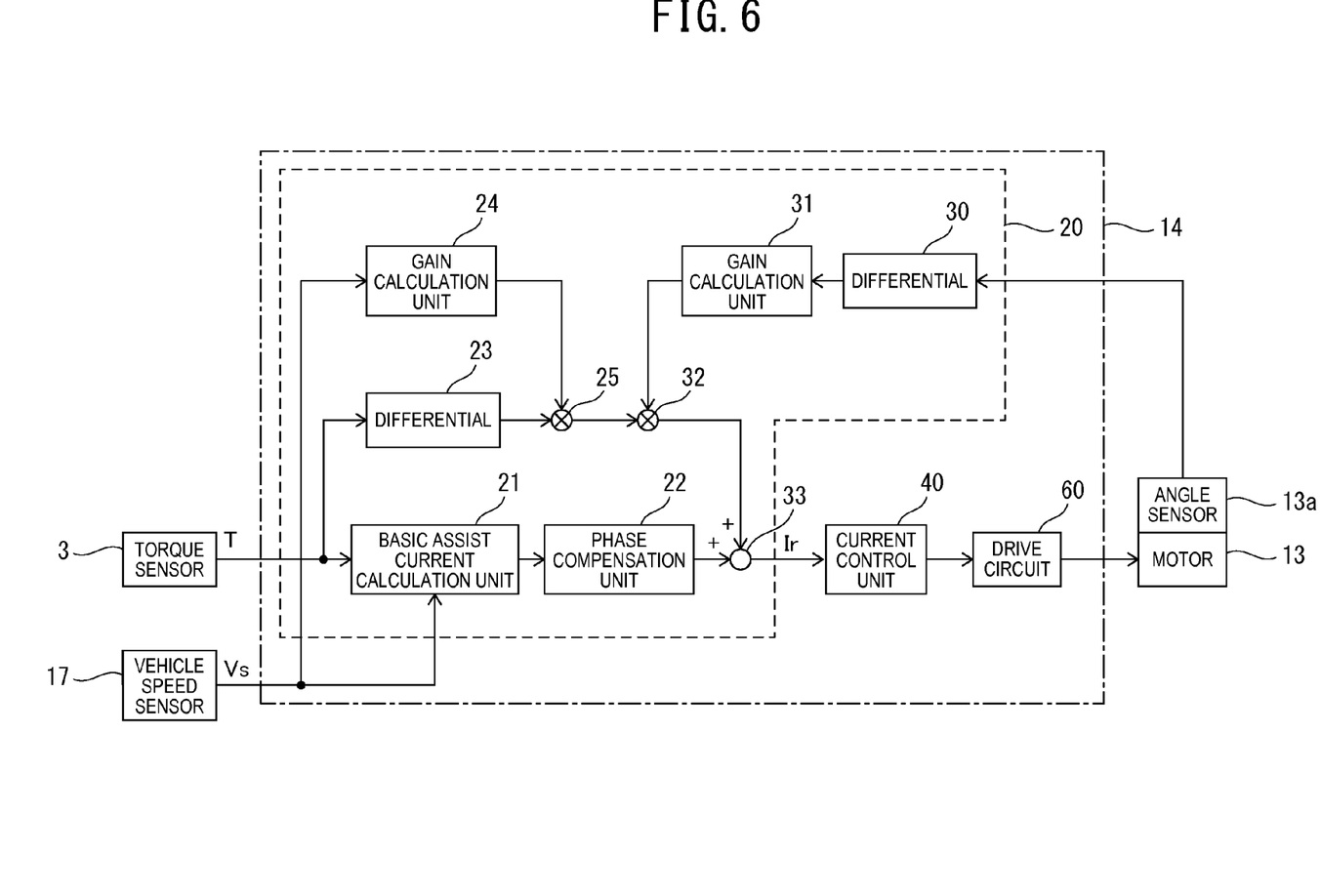
FIG. 6 is a block diagram illustrating a configuration of a controller in the second embodiment.

FIG. 6 is a block diagram illustrating a configuration of the controller 14 in the present embodiment.

As illustrated in FIG. 6, the controller 14 has a similar configuration to the controller 14 illustrated in FIG. 2, except that the deferential circuit 26, the gain calculation unit 27, the gain multiplier unit 28, and the adder unit 29 in FIG. 2 are replaced with a differential circuit 30, a gain calculation unit 31, a gain multiplier unit 32, and an adder unit 33. Therefore, the parts of different configurations are mainly described in this embodiment.

The differential circuit 30 is configured to receive the motor rotation angle of the electric motor 13 detected a motor angle sensor 13a and calculate the motor angle speed by differentiating the motor rotating angle.

The gain calculation unit 31 is configured to receive the motor angle speed output by the differential circuit 30 and calculate the gain Gs varying depending on the motor angle speed by reference to a predetermined gain calculation map. Similarly to the gain calculation map illustrated in FIG. 3, the gain calculation map is set so as to calculate the gain Gs at a predetermined motor angle speed to be smaller in comparison with a gain Gs0 (Gs0=1, for example) in another steering speed range.

The gain multiplier unit 32 is configured to calculate a corrected torque differential compensation value by multiplying the torque differential compensation value output by the gain multiplier unit 25 by the gain Gs calculated by the gain calculation unit 31.

The adder unit 33 is configured to add the corrected torque differential compensation value output by the gain multiplier unit 32 to the basic assist current command value after the phase compensation output by the phase compensation unit 22, and output the result to the current control unit 40 as the current command value Ir which is the output of the assist current command value calculation unit 20.

In this way, by using the differential value of the detection value (the motor rotation angle) of the motor angle sensor 13a as the steering speed, it is possible to obtain the same effect as the first embodiment using the differential value of the detection value (the steering angle θ) of the steering angle sensor 18.

Furthermore, it is possible in the present embodiment to omit the steering angle sensor 18 to reduce the costs. Common electric power steering apparatuses include a motor angle sensor for detecting the motor angle sensor, or a motor angle speed estimation unit for estimating the motor angle speed based on a back electromotive force of the motor or the like. Therefore, when using these sensor, it is not necessary to install a new sensor or the like for detecting the steering angle.

It is noted that, in FIG. 6, the motor angle sensor 13a corresponds to a rotation angle detection unit.

(Third Embodiment)

Next, the third embodiment of the present invention will be described.

The third embodiment calculates the torque differential compensation value by multiplying the differential value of the basic assist current command value by the gain Gv, whereas the first and the second embodiments described above calculate the torque differential compensation value by multiplying the differential value of the steering torque by the gain Gv.

Figure 7:
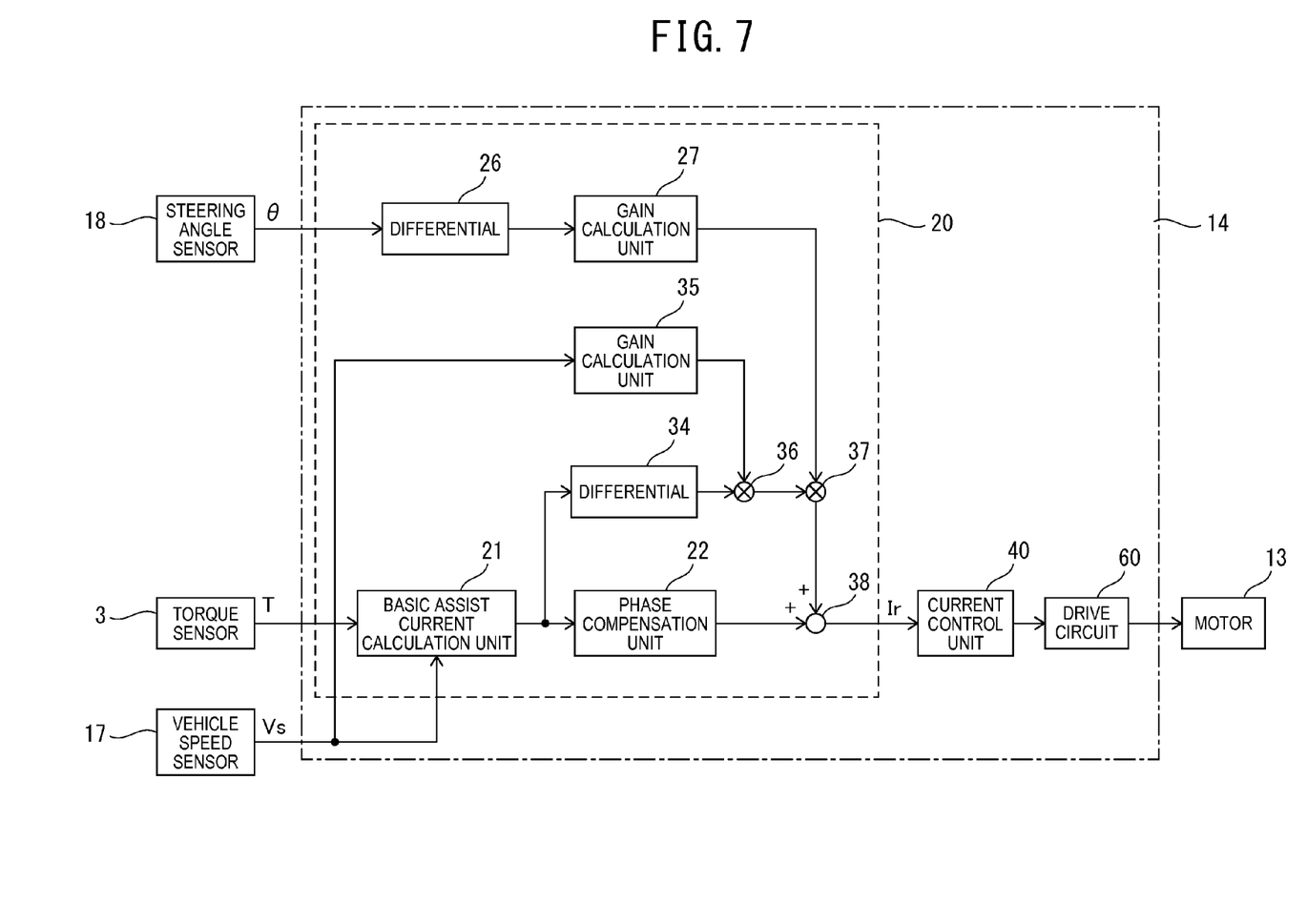
FIG. 7 is a block diagram illustrating a configuration of a controller in the third embodiment.

FIG. 7 is a block diagram illustrating a configuration of the controller 14 in the present embodiment.

As illustrated in FIG. 7, the controller 14 has a similar configuration to the controller 14 illustrated in FIG. 2, except that the differential circuit 23, the gain calculation unit 24, the gain multiplier unit 25, the gain multiplier unit 28, and the adder unit 29 in FIG. 2 are replaced with a differential circuit 34, a gain calculation unit 35, a gain multiplier unit 36, a gain multiplier unit 37, and an adder unit 38. Therefore, the parts of different configurations are mainly described in this embodiment.

The differential circuit 34 is configured to calculate a basic assist current differential value by differentiating the basic assist current command value calculated by the basic assist current calculation unit 21.

The gain calculation unit 35 is configured to receive the vehicle speed Vs and calculate the gain Gv varying depending on the vehicle speed Vs similarly to the gain calculation unit 24, and output the gain Gv to the gain multiplier unit 36.

The gain multiplier unit 36 is configured to calculate the basic assist current differential compensation value by multiplying the basic assist current differential value output by the differential circuit 34 by the gain Gv calculated by the gain calculation unit 35.

The gain multiplier unit 37 is configured to calculate the corrected basic assist current differential compensation value by multiplying the basic assist current differential compensation value output by the gain multiplier unit 36 by the gain Gs calculated by the gain calculation unit 27.

The adder unit 38 is configured to add the corrected basic assist current differential compensation value output by the gain multiplier unit 37 to the basic assist current command value after the phase compensation output by the phase compensation unit 22, and output the result to the current control unit 40 as the current command value Ir which is the output of the assist current command value calculation unit 20.

In this way, in the case where the torque differential compensation value is calculated based on the differential value of the basic assist current command value depending on the steering torque T, it is possible to obtain the same effect as the first embodiment in which the torque differential compensation value is calculated based on the differential value of the steering torque T.

It is noted that the third embodiment may omit the steering angle sensor 18 and use the differential value of the motor rotation angle detected the motor angle sensor 13a as the steering speed, similarly to the above mentioned second embodiment.

It is noted that, in FIG. 7, the differential circuit 34 corresponds to a basic assist current differential value calculation unit.

INDUSTRIAL APPLICABILITY

According to the electric power steering apparatus of the present invention, by reducing the torque differential compensation value at only the specific steering speed in which the resonance phenomenon easily occurs, it is possible to suppress the vibration component of the assist current, and to prevent the driver from feeling the fluctuation in the assist torque. Furthermore, since the torque differential compensation value is corrected to be reduced at only the specific steering speed, it is possible to set the assist characteristics with emphasis on the steering feeling. Therefore the electric power steering apparatus of the present invention is capable of suppressing the vibration while keeping the steering feeling, and is useful.

Additionally, according to the second aspect of the present invention, the torque differential compensation value calculation unit may be configured to calculate the torque differential value for compensating static friction relative to the steering mechanism based on the differential value of the steering torque.

In this way, since the current command value is calculated by adding the torque differential compensation value for compensating the static friction relative to the steering mechanism to the basic assist current command value, it is possible to appropriately improve the steering feeling.

Furthermore, according to the third aspect, the electric power steering apparatus may further include a specific steering speed setting unit configured to calculate a steering speed region in which a vibration frequency of the steering assist torque falls within a range of a natural frequency of the vehicle body based on a relational expression indicating a relationship between the vibration frequency of the steering assist torque and the steering speed, and set the steering speed region as the specific steering speed region.

In this way, it is possible to appropriately set the specific steering speed region in which the resonance phenomenon easily occurs. Especially, the relationship between the vibration frequency of the steering assist torque and the steering speed varies depending on a vibration factor such as an engagement vibration of a reduction gear or a motor torque fluctuation. Therefore, by preparing the relational expressions indicating the relationships between the vibration frequency of the steering assist torque and the steering speed for each vibration factor and by setting the specific steering speed region based on the relational expression, it is possible to effectively suppress the resonance phenomenon.

Furthermore, according to the fourth aspect, the electric power steering apparatus may further include a steering torque differential value calculation unit configured to differentiate the steering torque detected by the steering torque detection unit to calculate a steering torque differential value, and a vehicle speed detection unit configured to detect a vehicle speed. The torque differential compensation value calculation unit may be configured to calculate the torque differential compensation value depending on the differential value of the steering torque by multiplying the steering torque differential value calculated by the steering torque differential value calculation unit by a vehicle speed sensitive gain depending on the vehicle speed detected by the vehicle speed detection unit.

In this way, since the torque differential value obtained by differentiating the steering torque is used, it is possible to appropriately calculate the torque differential compensation value depending on the differential value of the steering torque.

Furthermore, according to the fifth aspect, the electric power steering apparatus may further include a basic assist current differential value calculation unit configured to differentiate the basic assist current command value calculated by the basic assist current calculation unit to calculate a basic assist current differential value, and a vehicle speed detection unit configured to detect a vehicle speed. The torque differential compensation value calculation unit may be configured to calculate the torque differential compensation value depending on the differential value of the steering torque by multiplying the basic assist current differential value calculated by the basic assist current differential value calculation unit by a vehicle speed sensitive gain depending on the vehicle speed detected by the vehicle speed detection unit.

In this way, since the differential value of the basic assist current command value calculated based on the steering torque is used, it is possible to appropriately calculate the torque differential compensation value depending on the differential value of the steering torque.

Furthermore, according to the sixth aspect, the electric power steering apparatus may further include a steering angle detection unit configured to detect a steering angle of the steering wheel. The steering speed detection unit may be configured to detect a differential value of the steering angle detected by the steering angle detection unit as the steering speed. In this way, it is possible to detect the steering speed with high accuracy.

Furthermore, according to the seventh aspect, the electric power steering apparatus may further include a rotation angle detection unit configured to detect a motor rotation angle of the electric motor. The steering speed detection unit is configured to detect a differential value of the motor rotation angle detected by the rotation angle detection unit as the steering speed. In this way, since the steering speed is detected by differentiating the motor rotation angle commonly used in the steering assist control, it is not necessary to newly provide a sensor for detecting the steering speed such as a steering angle sensor, a steering angle speed sensor, or the like.

According the present invention, by reducing the torque differential compensation value in only the specific steering speed region in which the resonance phenomenon easily occurs, it is possible to suppress a vibration component of the assist current and to prevent a driver from feeling a fluctuation in the assist torque. Furthermore, since the torque differential compensation value is corrected to be reduced in only the above mentioned specific steering speed region, it is possible to set assist characteristics with emphasis on the steering feeling. Therefore, it is possible to suppress the vibration while keeping the steering feeling.

REFERENCE SIGNS LIST

1 steering wheel
2 steering shaft
3 steering torque sensor
8 steering gear
10 steering assist mechanism
13 electric motor
13a motor angle sensor
14 controller
15 battery
16 ignition switch
17 vehicle speed sensor
18 steering angle sensor
20 assist current command value calculation unit
21 basic assist current calculation unit
22 phase compensation unit
23 differential circuit
24 gain calculation unit
25 gain multiplier unit
26 deferential circuit
27 gain calculation unit
28 gain multiplier unit
29 adder unit
30 differential circuit
31 gain calculation unit
32 gain multiplier unit
33 adder unit
34 differential circuit
35 gain calculation unit
36 gain multiplier unit
37 gain multiplier unit
38 adder unit
40 current control unit
60 drive circuit
80 current detection unit

The invention claimed is:

1. An electric power steering apparatus comprising:
   a steering torque detection unit configured to detect a steering torque applied to a steering mechanism;
   a current command value calculation unit configured to calculate a current command value based on at least the steering torque detected by the steering torque detection unit;
   an electric motor configured to generate a steering assist torque to be applied to a steering shaft of the steering mechanism;
   a motor control unit configured to control driving of the electric motor based on the current command value; and
   a steering speed detection unit configured to detect a steering speed of a steering wheel,
   wherein the current command value calculation unit comprises:
      a basic assist current calculation unit configured to calculate a basic assist current command value based on the steering torque detected by the steering torque detection unit;
      a torque differential compensation value calculation unit configured to calculate a torque differential compensation value based on a differential value of the steering torque;
      a correction unit configured to correct the torque differential compensation value calculated by the torque differential compensation value calculation unit when the steering speed detected by the steering speed detection unit falls within a specific steering speed region in which a resonance phenomenon occurs at a vehicle body due to a disturbance vibration of the steering assist torque to be smaller than the torque differential compensation value when the steering speed falls outside the specific steering speed region; and
      a specific steering speed setting unit configured to calculate a steering speed region in which a vibration frequency of the steering assist torque falls within a range of a natural frequency of the vehicle body based on a plurality of relational expressions corresponding to a plurality of occurrence factors of a vibration, respectively, each of the plurality of relational expressions indicating relationships between the vibration frequency of the steering assist torque and the steering speed, and to set the steering speed region as the specific steering speed region,
      wherein the current command value calculation unit is configured to calculate the current command value by adding the torque differential compensation value corrected by the correction unit to the basic assist current command value calculated by the basic assist current calculation unit.

2. The electric power steering apparatus according to claim 1, wherein the torque differential compensation value calculation unit is configured to calculate the torque differential compensation value for compensating static friction relative to the steering mechanism based on the differential value of the steering torque.

3. The electric power steering apparatus according to claim 1, further comprising:
   a steering torque differential value calculation unit configured to differentiate the steering torque detected by the steering torque detection unit to calculate a steering torque differential value; and
   a vehicle speed detection unit configured to detect a vehicle speed,
   wherein the torque differential compensation value calculation unit is configured to calculate the torque differential compensation value depending on the differential value of the steering torque by multiplying the steering torque differential value calculated by the steering torque differential value calculation unit by a vehicle speed sensitive gain depending on the vehicle speed detected by the vehicle speed detection unit.

4. The electric power steering apparatus according to claim 1, further comprising:
   a basic assist current differential value calculation unit configured to differentiate the basic assist current command value calculated by the basic assist current calculation unit to calculate a basic assist current differential value; and
   a vehicle speed detection unit configured to detect a vehicle speed,
   wherein the torque differential compensation value calculation unit is configured to calculate the torque differential compensation value depending on the differential value of the steering torque by multiplying the basic assist current differential value calculated by the basic assist current differential value calculation unit by a vehicle speed sensitive gain depending on the vehicle speed detected by the vehicle speed detection unit.

5. The electric power steering apparatus according to claim 1, further comprising a steering angle detection unit configured to detect a steering angle of the steering wheel,
   wherein the steering speed detection unit is configured to detect a differential value of the steering angle detected by the steering angle detection unit as the steering speed.

6. The electric power steering apparatus according to claim 1, further comprising a rotation angle detection unit configured to detect a motor rotation angle of the electric motor,
   wherein the steering speed detection unit is configured to detect a differential value of the motor rotation angle detected by the rotation angle detection unit as the steering speed.

7. The electric power steering apparatus according to claim 1, wherein the plurality of relational expressions include an expression of $f=\omega/360 \cdot N$ representing the vibration frequency f of the vibration which occurs on the steering shaft due to an engagement vibration of a reduction gear, where $\omega$ is the steering speed and N is the number of teeth of a driven gear of the reduction gear.

8. The electric power steering apparatus according to claim 1, wherein the plurality of relational expressions include an expression of $f=\omega/360 \cdot G \cdot M \cdot n$ representing the vibration frequency f of the vibration which occurs on the steering shaft due to a motor torque fluctuation, where $\omega$ is the steering speed, G is a reduction gear ratio, M is the number of magnetic pole pairs of the electric motor, and n is an order component of a motor electrical angle corresponding to the occurrence factors.

9. The electric power steering apparatus according to claim 8, wherein the order component of the motor electrical angle includes at least a first, a second, and a sixth order components of the motor electrical angle.

10. The electric power steering apparatus according to claim 1, wherein the plurality of relational expressions include an expression of $f=\omega/360 \cdot G \cdot k$ representing the vibration frequency f of the vibration which occurs on the steering shaft due to a motor installation error, where $\omega$ is the steering speed, G is a reduction gear ratio, and k is an order component of a motor mechanical angle.

* * * * *